US009941495B2

(12) United States Patent
Naito (10) Patent No.: US 9,941,495 B2
(45) Date of Patent: Apr. 10, 2018

(54) VEHICLE MOUNT STRUCTURE FOR FUEL CELL STACK

(71) Applicant: HONDA MOTOR CO., LTD., Tokyo (JP)

(72) Inventor: Hideharu Naito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/451,408

(22) Filed: Mar. 7, 2017

(65) Prior Publication Data

US 2017/0256762 A1 Sep. 7, 2017

(30) Foreign Application Priority Data

Mar. 7, 2016 (JP) ................. 2016-043397

(51) Int. Cl.
*H01M 2/10* (2006.01)
*H01M 8/241* (2016.01)
*H01M 8/2457* (2016.01)
*H01M 8/1004* (2016.01)
*B60K 1/04* (2006.01)
*B60L 11/18* (2006.01)
*H01M 8/1018* (2016.01)

(52) U.S. Cl.
CPC .............. *H01M 2/1083* (2013.01); *B60K 1/04* (2013.01); *B60L 11/1896* (2013.01); *H01M 2/1077* (2013.01); *H01M 8/1004* (2013.01); *H01M 8/241* (2013.01); *H01M 8/2457* (2016.02); *B60K 2001/0411* (2013.01); *H01M 2008/1095* (2013.01); *H01M 2250/20* (2013.01); *H01M 2300/0082* (2013.01); *Y02E 60/521* (2013.01); *Y02T 90/32* (2013.01)

(58) Field of Classification Search
CPC .................. H01M 2008/1095; H01M 2250/20
See application file for complete search history.

(56) References Cited

FOREIGN PATENT DOCUMENTS

| JP | 2009-002466 | 1/2009 |
|----|-------------|--------|
| JP | 2011-214651 | 10/2011 |
| JP | 2014-101058 | 6/2014 |
| JP | 2014-216269 | 11/2014 |
| WO | WO2015/115321 | 8/2015 |

OTHER PUBLICATIONS

Japanese Office Action for corresponding JP Application No. 2016-043397, dated Oct. 24, 2017 (w/ English machine translation).

*Primary Examiner* — Olatunji Godo
(74) *Attorney, Agent, or Firm* — Mori & Ward, LLP

(57) ABSTRACT

A vehicle mount structure for includes a stack case and a boss. The stack case accommodates a fuel cell stack. The stack case includes a bottom panel to be provided on a bracket member of a vehicle. The bottom panel includes a lower plate and an intermediate member. The lower plate is opposite to and below an upper plate in a height direction of the vehicle. The lower plate has an opening to surround a bearing surface of the bracket member. The intermediate member is disposed between the upper plate and the lower plate. The intermediate member has a thickness thicker than a thickness of the upper plate and a thickness of the lower plate. The boss is disposed on the intermediate member and includes a rib. The boss with the rib protrudes toward the bracket member to pass through the opening.

8 Claims, 8 Drawing Sheets

VEHICLE MOUNT STRUCTURE FOR FUEL CELL STACK

CROSS-REFERENCE TO RELATED APPLICATIONS

The present application claims priority under 35 U.S.C. § 119 to Japanese Patent Application No. 2016-043397, filed Mar. 7, 2016, entitled "Vehicle Mount Structure for Fuel Cell Stack." The contents of this application are incorporated herein by reference in their entirety.

BACKGROUND

1. Field

The present disclosure relates to a vehicle mount structure for fuel cell stack.

2. Description of the Related Art

For example, a solid polymer electrolyte fuel cell includes a membrane electrode assembly (MEA) in which an anode electrode is disposed on one surface of an electrolyte membrane, which is a solid polymer ion-exchange membrane, and a cathode electrode is disposed on the other surface of the electrolyte membrane. The membrane electrode assembly and separators, sandwiching the membrane electrode assembly, constitute a power generation cell (unit cell). Typically, a predetermined number of power generation cells are stacked to form a fuel cell stack, which is used, for example, as a vehicle fuel cell stack mounted in a fuel cell vehicle (fuel cell electric automobile or the like).

In a vehicle fuel cell stack, fuel cells need to be reliably protected against vibration generated when the vehicle is moving and an external load generated when a collision or the like occurs. For example, Japanese Unexamined Patent Application Publication No. 2014-101058 describes a fuel cell vehicle having a structure for protecting fuel cells.

The fuel cell vehicle includes a mount mechanism on which a fuel cell stack is mounted. The mount mechanism includes a back holder that fixes a back part of the fuel cell stack in the vehicle-length direction to a vehicle body frame. The mount mechanism further includes a front holder that holds a front part of the fuel cell stack in the vehicle-length direction. When an external load is applied to the fuel cell vehicle, the front holder becomes deformed and maintains the function of holding the fuel cell stack.

It is described that it is possible to reduce accidental removal of the fuel cell stack from the mount mechanism when an external load is applied to the fuel cell vehicle and to simplify the structure of the fuel cell vehicle.

SUMMARY

According to one aspect of the present invention, a vehicle mount structure for mounting a fuel cell stack on a bracket member of a vehicle, the fuel cell stack including a stack of power generation cells disposed in a stack case, each of the power generation cells generating electric power by an electrochemical reaction between a fuel gas and an oxidant gas, the vehicle mount structure includes a bottom panel of the stack case and a boss. The bottom panel includes at least an upper plate, a lower plate, and an intermediate member. An opening is formed in the lower plate so as to surround a bearing surface of the bracket member. The intermediate member is disposed between the upper plate and the lower plate and is thicker than the upper plate and the lower plate. The boss is disposed on the intermediate member and includes a rib. The boss and the rib extend through the opening and protrude to a position below the lower plate.

According to another aspect of the present invention, a vehicle mount structure for includes a stack case and a boss. The stack case accommodates a fuel cell stack. The fuel cell includes power generation cells stacked to generate electric power via an electrochemical reaction between a fuel gas and an oxidant gas. The stack case includes a bottom panel to be provided on a bracket member of a vehicle. The bottom panel includes an upper plate, a lower plate, and an intermediate member. The lower plate is opposite to and below the upper plate in a height direction of the vehicle. The lower plate has an opening to surround a bearing surface of the bracket member. The intermediate member is disposed between the upper plate and the lower plate. The intermediate member has a thickness thicker than a thickness of the upper plate and a thickness of the lower plate. The boss is disposed on the intermediate member and includes a rib. The boss with the rib protrudes toward the bracket member to pass through the opening.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
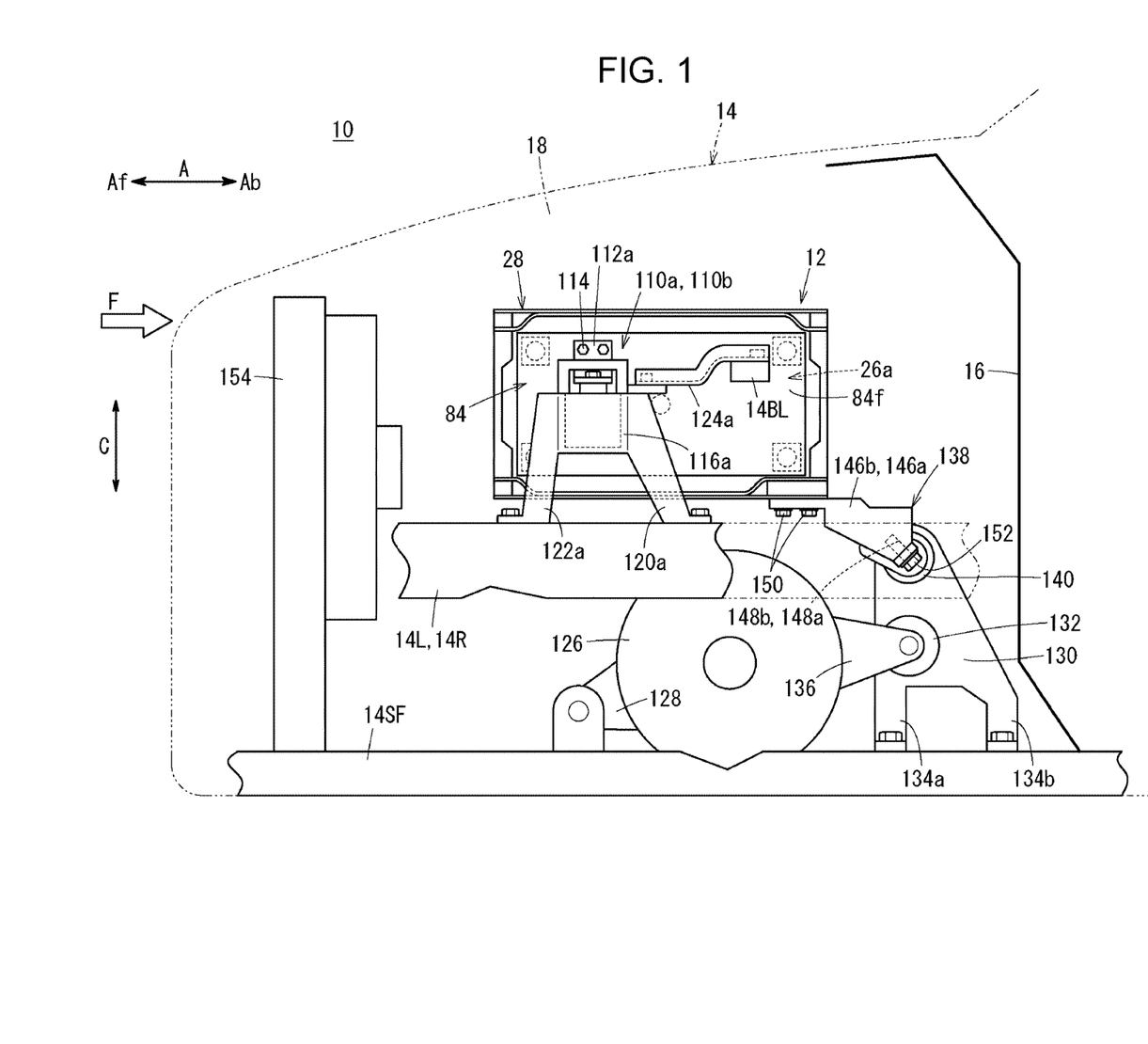
FIG. 1 is a schematic side view of a front part of a fuel cell electric automobile in which a fuel cell stack, to which a vehicle mount structure according to an embodiment of the present disclosure is applied, is mounted.
Figure 2:
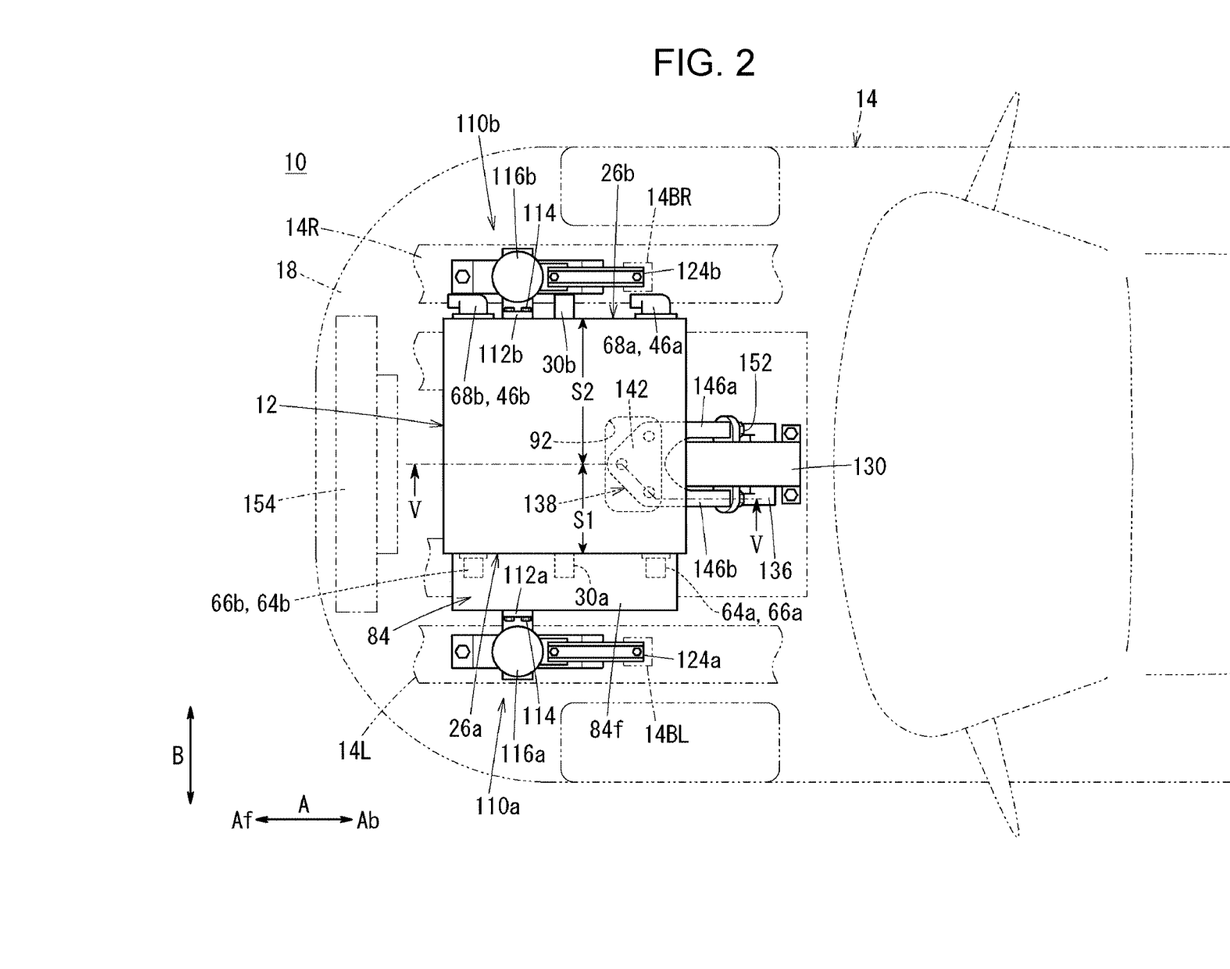
FIG. 2 is a schematic plan view of the fuel cell electric automobile.

Referring to FIGS. 1 and 2, a fuel cell stack 12, to which a vehicle mount structure 10 according to an embodiment of the present disclosure is applied, is mounted in a fuel cell electric automobile 14 (fuel cell vehicle). The fuel cell stack 12 is disposed in a motor room 18 (front box) of the fuel cell electric automobile 14, which is located in front of a dash board 16 (see FIG. 1).

Referring to FIGS. 1 and 2, in the motor room 18, first vehicle frames 14R and 14L (for example, side frames), which are parts of the vehicle body frame, extend in the direction of arrow A. The fuel cell stack 12 is mounted on the first vehicle frames 14R and 14L and a second vehicle frame 14SF (described below).

Figure 3:
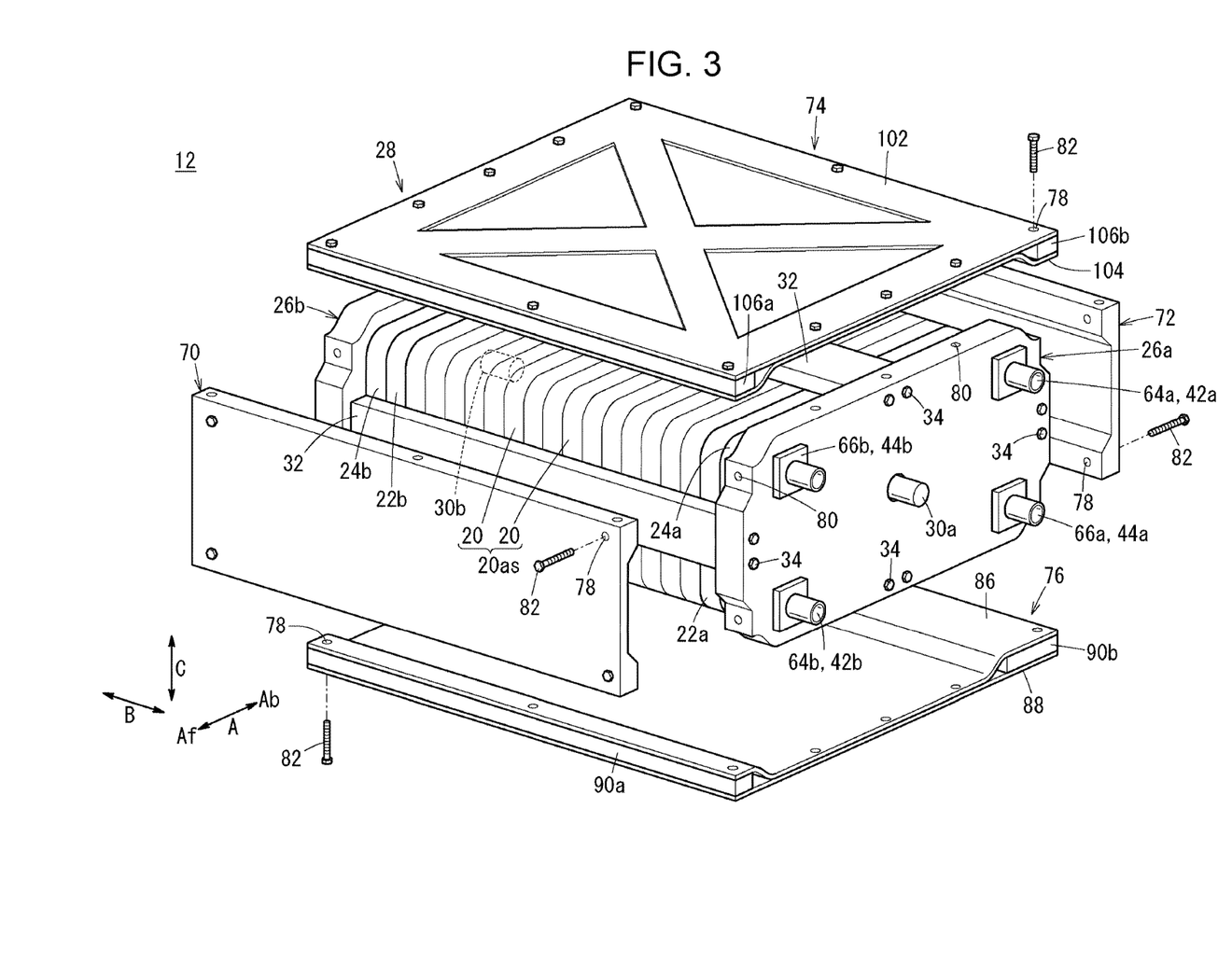
FIG. 3 is a partially exploded perspective view of a stack case in which the fuel cell stack is disposed.

Referring to FIG. 3, the fuel cell stack 12 includes a stacked body 20*as*, in which a plurality of power generation cells 20 are stacked in the vehicle width direction (direction of arrow B). At one end of the stacked body 20*as* in the stacking direction, a first terminal plate 22*a*, a first insulation plate 24*a*, and a first end plate 26*a* are arranged outward.

At the other end of the stacked body 20*as* in the stacking direction, a second terminal plate 22*b*, a second insulation plate 24*b*, and a second end plate 26*b* are arranged outward. The stacked body 20*as* is disposed in a stack case 28, which has the first end plate 26*a* and the second end plate 26*b* as its end plates. The stack case 28 may have independent plate members outside the first end plate 26*a* and the second end plate 26*b*.

The first end plate 26*a* and the second end plate 26*b* each have outer dimensions greater than those of the power generation cell 20, the first insulation plate 24*a*, and the second insulation plate 24*b*. The first terminal plate 22*a* may be disposed in a recess formed in the first insulation plate 24*a*, and the second terminal plate 22*b* may be disposed in a recess formed in the second insulation plate 24*b*.

The first end plate 26*a* has a horizontally-elongated shape. A first power output terminal 30*a*, which is connected to the first terminal plate 22*a*, extends outward from a central part (or an off-center part) of the first end plate 26*a*. The second end plate 26*b* has a horizontally-elongated shape. A second power output terminal 30*b*, which is connected to the second terminal plate 22*b*, extends outward from a central part (or an off-center part) of the second end plate 26*b*.

Connection bars 32, having a uniform length, are disposed between central parts of edge portions of the first end plate 26*a* and central parts of edge portions of the second end plate 26*b*. Ends of the connection bars 32 are fixed to the first and second end plates 26*a* and 26*b* by using screws 34, thereby applying a fastening load to the stacked body 20*as* in the stacking direction (direction of arrow B).

Figure 4:
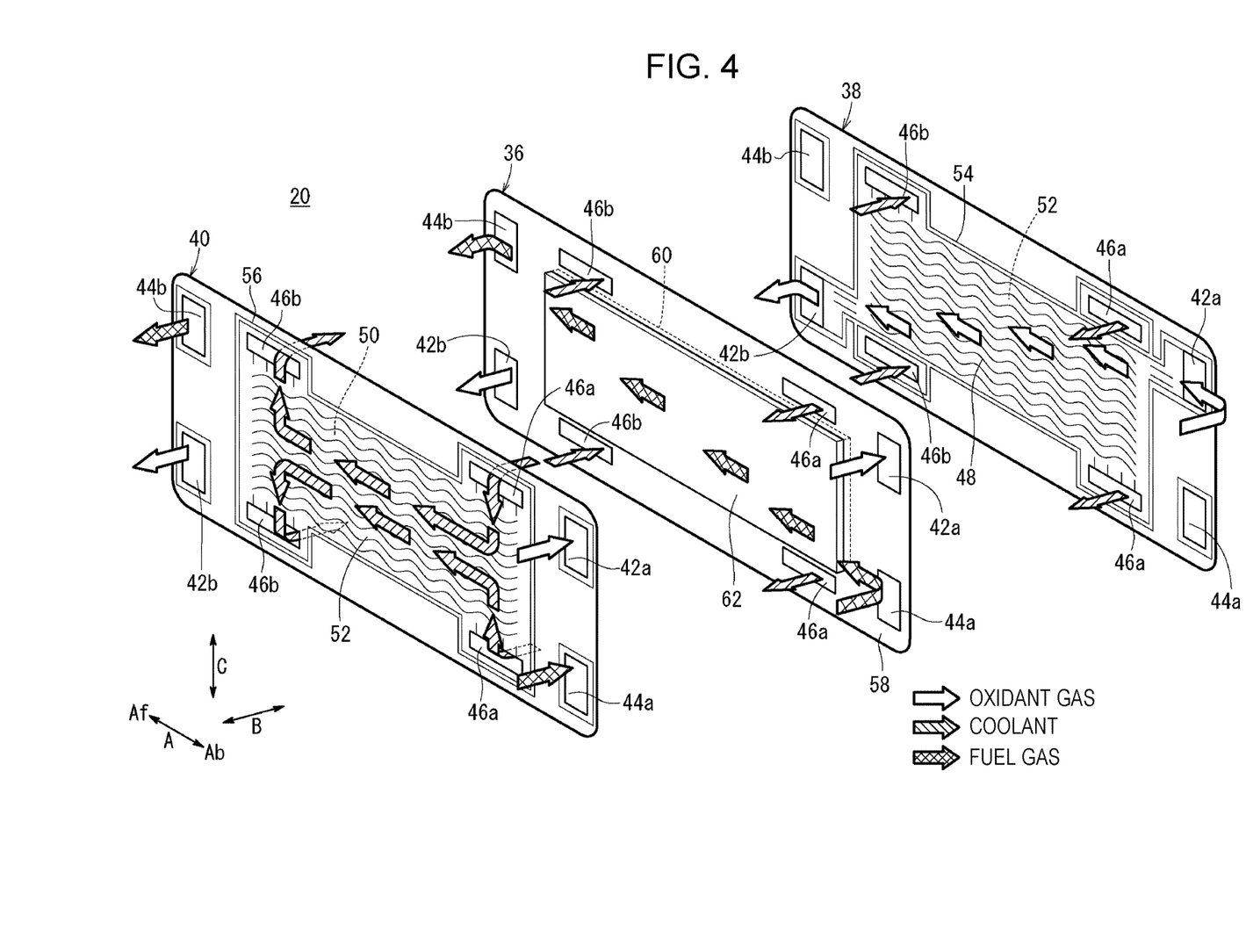
FIG. 4 is an exploded perspective view of a power generation cell of the fuel cell stack.

Referring to FIG. 4, in the power generation cell 20, a membrane electrode assembly 36 is sandwiched between a first separator 38 and a second separator 40. Preferably, the four corners of the power generation cell 20 have a curved shape (round shape) corresponding to the shape of the corners of the first end plate 26*a* and the second end plate 26*b*. The first separator 38 and the second separator 40 are metal separators or carbon separators.

An oxidant gas inlet manifold 42*a* and a fuel gas inlet manifold 44*a* extend in the stacking direction (direction of arrow B) through one end portion of the power generation cell 20 in the direction of arrow A. The oxidant gas inlet manifold 42*a* and the fuel gas inlet manifold 44*a* are arranged in the direction of arrow C (vertical direction). An oxidant gas, such as an oxygen-containing gas (air), is supplied through the oxidant gas inlet manifold 42*a*. A fuel gas, such as a hydrogen-containing gas (hydrogen gas), is supplied through the fuel gas inlet manifold 44*a*.

A fuel gas outlet manifold 44*b* and an oxidant gas outlet manifold 42*b* extend in the direction of arrow B through the other end portion of the power generation cell 20 in the direction of arrow A. The fuel gas outlet manifold 44*b* and the oxidant gas outlet manifold 42*b* are arranged in the direction of arrow C. The fuel gas is discharged through the fuel gas outlet manifold 44*b*. The oxidant gas is discharged through the oxidant gas outlet manifold 42*b*.

A pair of upper and lower coolant inlet manifolds 46*a* extend in the direction of arrow B through a portion of the power generation cell 20 near the oxidant gas inlet manifold 42*a* and the fuel gas inlet manifold 44*a*. A coolant is supplied through the coolant inlet manifold 46*a*. A pair of upper and lower coolant outlet manifolds 46*b* extend in the direction of arrow B through a portion of the power generation cell 20 near the fuel gas outlet manifold 44*b* and the oxidant gas outlet manifold 42*b*. The coolant is discharged through the coolant outlet manifold 46*b*.

An oxidant gas channel 48, which is connected to the oxidant gas inlet manifold 42*a* and the oxidant gas outlet manifold 42*b*, is formed on a surface of the first separator 38 facing the membrane electrode assembly 36. A fuel gas channel 50, which is connected to the fuel gas inlet manifold 44*a* and the fuel gas outlet manifold 44*b*, is formed on a surface of the second separator 40 facing the membrane electrode assembly 36.

A coolant channel 52, which connects the coolant inlet manifold 46*a* to the coolant outlet manifold 46*b*, is formed between the first separator 38 of the power generation cell 20 and the second separator 40 of an adjacent power generation cell 20. A first sealing member 54 is integrally or independently formed on the first separator 38. A second sealing member 56 is integrally or independently formed on the second separator 40.

The membrane electrode assembly 36 includes a solid polymer electrolyte membrane 58 (cation exchange membrane), a cathode electrode 60, and an anode electrode 62. The solid polymer electrolyte membrane 58 is, for example, a thin film made of a perfluorosulfonic acid polymer including water. The cathode electrode 60 and the anode electrode 62 sandwich the solid polymer electrolyte membrane 58. The cathode electrode 60 and the anode electrode 62 each include a gas diffusion layer and an electrode catalyst layer. The gas diffusion layer is made of carbon paper or the like. The electrode catalyst layer is formed on the gas diffusion layer by uniformly coating the surface of the gas diffusion layer with porous carbon particles whose surfaces support a platinum alloy. The electrode catalyst layers are disposed on both sides of the solid polymer electrolyte membrane 58.

Referring to FIG. 3, an oxidant gas supply manifold member 64*a*, which is connected to the oxidant gas inlet manifold 42*a*, and an oxidant gas discharge manifold member 64*b*, which is connected to the oxidant gas outlet manifold 42*b*, are disposed at one pair of opposite corners of the first end plate 26*a*. A fuel gas supply manifold member 66*a*, which is connected to the fuel gas inlet manifold 44*a*, and a fuel gas discharge manifold member 66*b*, which is connected to the fuel gas outlet manifold 44*b*, are disposed at the other pair of opposite corners of the first end plate 26*a*.

Referring to FIG. 2, a coolant supply manifold member 68*a*, which is connected to the pair of coolant inlet manifolds 46*a*, and a coolant discharge manifold member 68*b*, which is connected to the pair of coolant outlet manifolds 46*b*, are disposed on the second end plate 26*b*.

Referring to FIG. 3, the stack case 28 includes a front side panel 70, a back side panel 72, an upper panel 74, a lower panel 76, the first end plate 26*a*, and the second end plate 26*b*. The components of the stack case 28 are fixed to each other and to the first end plate 26*a* and the second end plate 26*b* by using screws 82, which are inserted through holes 78 and screwed into tapped holes 80.

The front side panel 70 and the back side panel 72 form two sides (surfaces) of the stack case 28 at ends in the vehicle-length direction (direction of arrow A). The upper panel 74 and the lower panel 76 form two sides (surfaces) of the stack case 28 at ends in the vehicle-height direction (direction of arrow C). Alternatively, the stack case 28 may have a structure that covers the entirety of the fuel cell stack 12 without using the first end plate 26*a* and the second end plate 26*b* as its components.

Referring to FIG. 2, a fuel gas device unit 84 (fuel gas device) is fixed to the first end plate 26*a* by using screws or the like. The fuel gas device unit 84 includes an ejector, a hydrogen pump, a gas-liquid separator, valves (such as a purge valve and a check valve), which are not shown in the figures. As necessary, the fuel gas device unit 84 may further include an injector or the like. The fuel gas device unit 84 is covered by a device cover 84*f*.

Referring to FIG. 3, the lower panel 76, which is a bottom panel (bottom portion) of the stack case 28, at least includes an upper plate 86, a lower plate 88, and intermediate members 90*a* and 90*b* disposed between the upper plate 86 and the lower plate 88. The upper plate 86, the lower plate 88, and the intermediate members 90*a* and 90*b* are joined to each other.

The upper plate 86 and the lower plate 88 are each made by press-forming a thin metal plate so as to have an undulated surface. The lower plate 88 has an opening 92 at a position that is near a back end of the lower plate 88 in the vehicle front-back direction (direction of arrow Ab) and that is offset toward the first end plate 26*a* in the vehicle width direction (direction of arrow B) (see FIG. 2). The opening 92 surrounds a bearing surface 142 of a bracket member 138 (described below).

Figure 6:
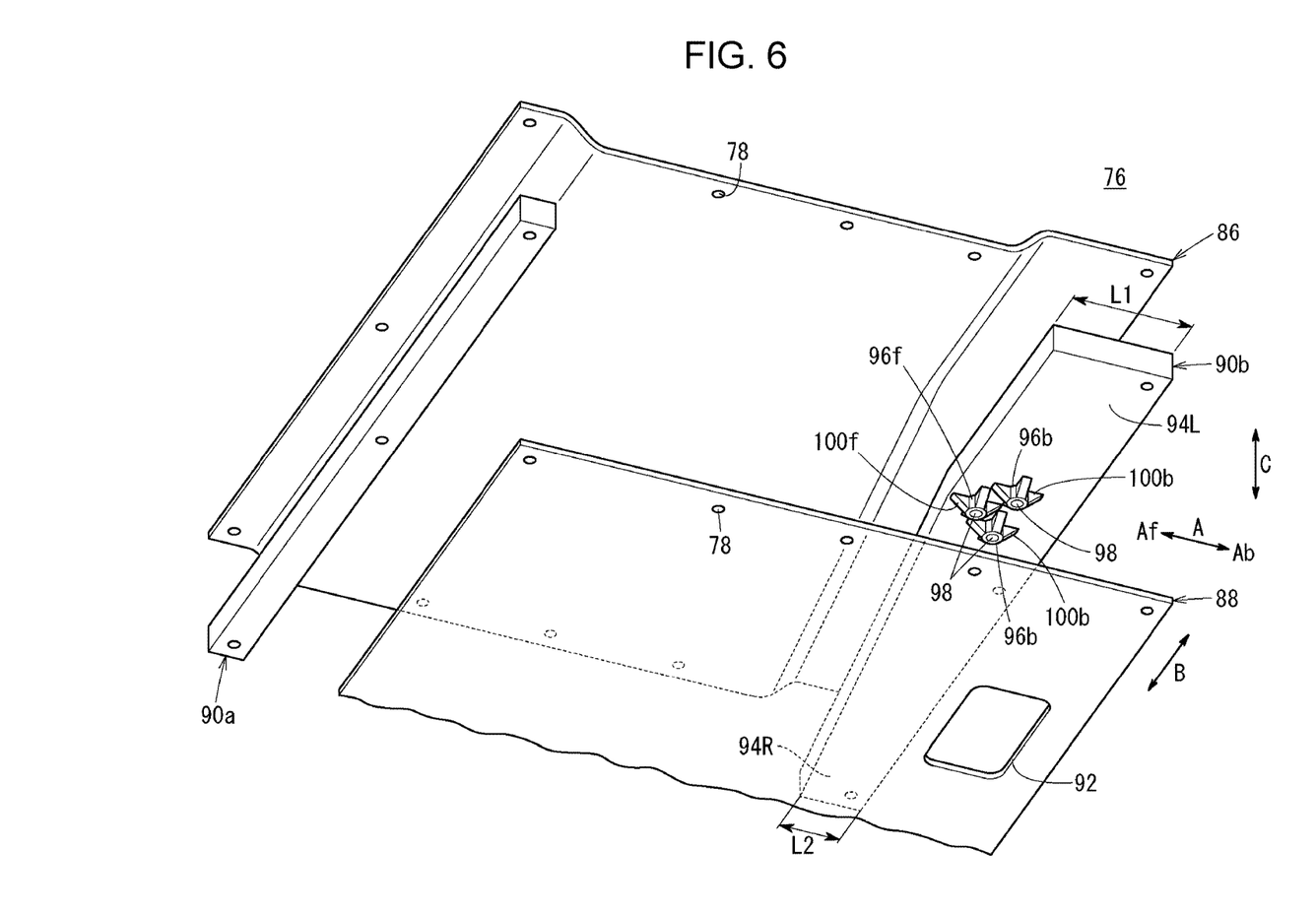
FIG. 6 is a perspective exploded view of a lower panel of the stack case seen from below.

Referring to FIG. 6, the intermediate member 90*a* has a substantially square-bar-like shape that is elongated in the direction of arrow B. The thickness of the intermediate member 90*a* is greater that of each of the upper plate 86 and the lower plate 88. The intermediate member 90*b* has a substantially triangular shape that is elongated in the direction of arrow B. The width L1 of an end portion 94L of the intermediate member 90*b* near the first end plate 26*a* is greater than the width L2 of an end portion 94R of the intermediate member 90*b* near the second end plate 26*b* (L1>L2).

One front boss 96*f* and two back bosses 96*b* are formed on the bottom surface of the intermediate member 90*b* so as to protrude downward. The front and back bosses 96*f* and 96*b* are located at positions that are offset toward the end portion 94L, which has a larger width. The front boss 96*f* and the back bosses 96*b* each have a tapped hole 98. The front boss 96*f* has a plurality of ribs 100*f*, which extend from the bottom surface of the intermediate member 90*b* toward an end of the front boss 96*f*. Each of the back bosses 96*b* has a plurality of ribs 100*b*, which extend from the bottom surface of the intermediate member 90*b* toward an end of the back boss 96*b*.

The front boss 96*f* and the ribs 100*f* and the back bosses 96*b* and the ribs 100*b* extend through the opening 92 of the lower plate 88 to positions below the lower plate 88 and are fixed to the bracket member 138 (described below) of the vehicle (see FIGS. 5 and 7).

The intermediate members 90*a* and 90*b* are fixed to the upper plate 86 and the lower plate 88 by MIG welding, TIG welding, spot welding, brazing, or friction stir welding. The upper plate 86 and the lower plate 88 are fixed to each other by welding or the like. The upper plate 86, the lower plate 88, and the intermediate members 90*a* and 90*b* each has holes 78, for inserting bolts, at appropriate positions.

Figure 5:
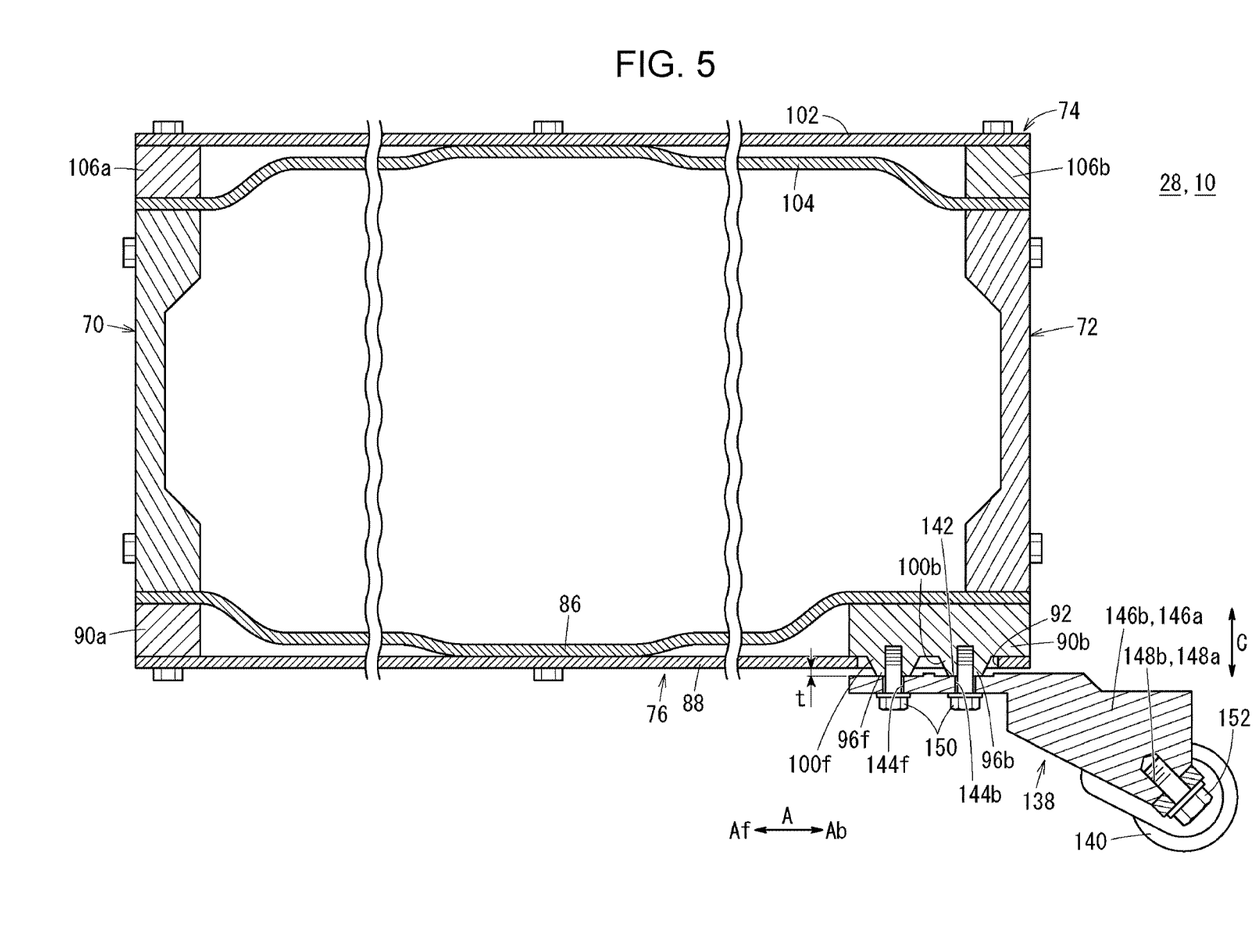
FIG. 5 is a sectional view of the stack case taken along line V-V in FIG. 2.

Referring to FIGS. 3 and 5, the upper panel 74, which is a top portion of the stack case 28, includes an upper plate 102 and a lower plate 104, which are a pair of pressed plates (press-formed plates) that are joined to each other. The upper plate 102 and the lower plate 104 are each made by press-forming a thin metal plate so as to have an undulated surface. Intermediate members 106*a* and 106*b* are disposed between the upper plate 102 and the lower plate 104 along end portions (in the direction of arrow A) of the upper plate 102 and the lower plate 104 extending in the stacking direction (direction of arrow B).

The intermediate members 106*a* and 106*b* are fixed to the upper plate 102 and the lower plate 104 by MIG welding, TIG welding, spot welding, brazing, or friction stir welding. The upper plate 102 and the lower plate 104 are fixed to each other by welding or the like.

Referring to FIGS. 1 and 2, the vehicle mount structure 10 includes side mounts 110*a* and 110*b*, which support the fuel cell stack 12 and fix the fuel cell stack 12 to the first vehicle frames 14L and 14R. The side mount 110*a* includes a plate member 112*a*, which is bent so as to have an L-shaped cross section. The plate member 112*a* is fixed to the device cover 84*f* by using a plurality of screws 114.

Figure 8:
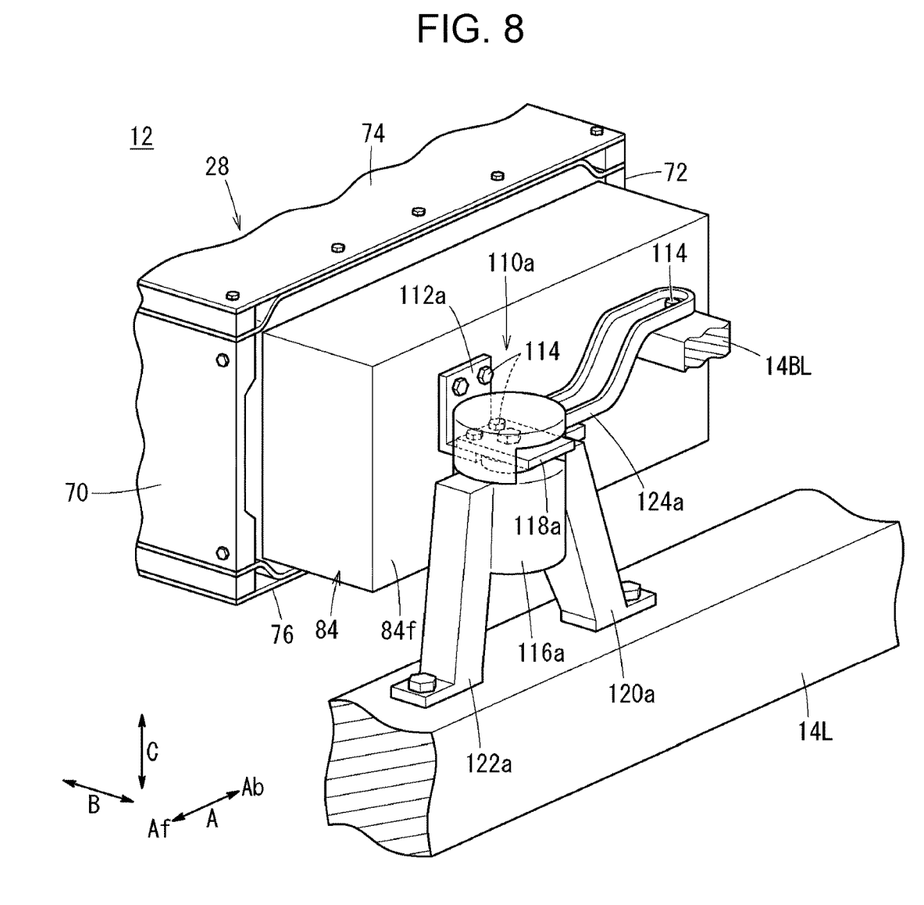
FIG. 8 is a perspective view of a side mount that supports the fuel cell stack.

Referring to FIG. 8, the side mount 110*a* includes a shock absorber 116*a* (hydraulic mount), which is fixed to the device cover 84*f* via the plate member 112*a*. The device cover 84*f* is located at an end of the fuel cell stack 12 in the vehicle width direction. A connection plate 118*a* of the shock absorber 116*a* is fixed to the plate member 112*a* by using screws 114.

The shock absorber 116*a* includes attachment portions 120*a* and 122*a* for attaching the shock absorber 116*a* to the first vehicle frame 14L. In the side mount 110*a*, one end of a bracket 124*a* is fixed to an upper part of the shock absorber 116*a* by using screws 114. The bracket 124*a* has a long and curved plate-like shape. The other end the bracket 124*a* is fixed to a vehicle body portion 14BL by using screws 114.

Referring to FIG. 2, the side mount 110*b* is structured in the same way as the side mount 110*a*. Elements of the side mount 110*b* that are the same as those of the side mount 110*a* are denoted by the same numerals with "b" instead of "a", and detailed descriptions of such elements will be omitted. The side mount 110*b* is fixed to the first vehicle frame 14R by using screws, and a bracket 124*b* is fixed to a vehicle body portion 14BR.

Referring to FIG. 1, the vehicle mount structure 10 includes the second vehicle frame 14SF (for example, a cross member), which is disposed below the fuel cell stack 12. The bracket member 138 is fixed to the second vehicle frame 14SF via a mount member 130 (described below) (see FIG. 2). A drive motor 126, which can be driven by electric power generated by the fuel cell stack 12, is disposed below the fuel cell stack 12 in the vertical direction. A front part of the drive motor 126 is fixed to the second vehicle frame 14SF via a motor bracket 128 by using screws (see FIG. 1).

The vehicle mount structure 10 includes the mount member 130, which fixes a back part of the drive motor 126 to the second vehicle frame 14SF. The mount member 130 includes a motor fixing portion 132 and attachment portions 134*a* and 134*b* below the motor fixing portion 132. The attachment portions 134*a* and 134*b* are fixed to the second vehicle frame 14SF by using screws. The attachment portions 134*a* and 134*b* have different lengths. A bracket portion 136, which is attached to the drive motor 126, is fixed to the motor fixing portion 132 by using screws.

The bracket member 138 is fixed to an upper part of the mount member 130 via a bracket fixing portion 140. Referring to FIGS. 2, 5, and 7, the bearing surface 142, which has a substantially triangular shape, is formed on the upper surface of the bracket member 138. The bearing surface 142 is connected to a bottom portion of the fuel cell stack 12, to be specific, to a lower surface of an end portion of the lower panel 76 in the direction of arrow Ab at a position that is offset toward the first end plate 26*a*.

Figure 7:
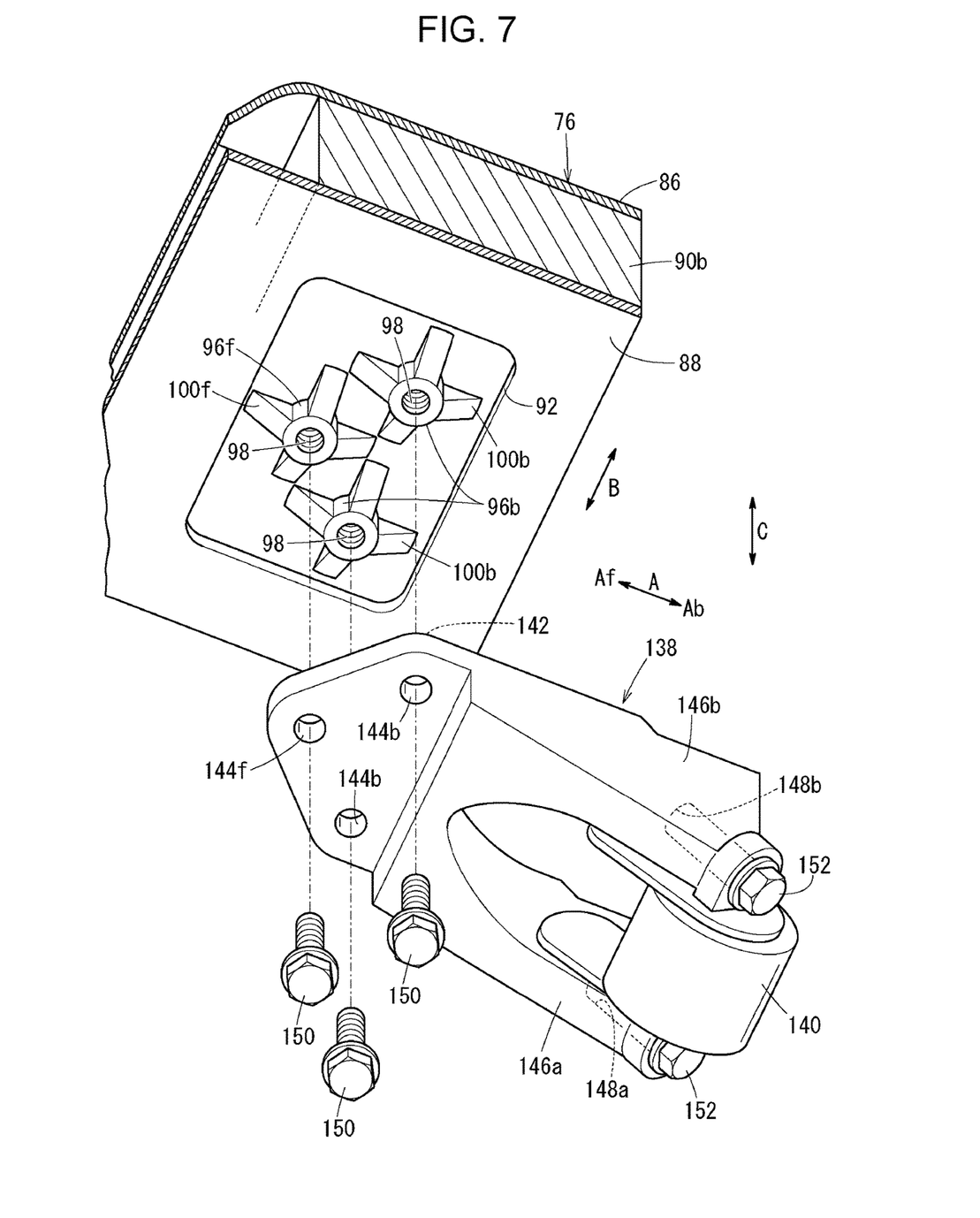
FIG. 7 is a perspective view of the lower panel and a bracket member seen from below.

Referring to FIG. 7, a front hole 144f is formed in a triangular end portion of the bearing surface 142, and a back hole 144b is formed in each of back corners of the bearing surface 142. The front hole 144f is coaxial with the tapped hole 98 of the front boss 96f, and each of the back holes 144b is coaxial with the tapped hole 98 of a corresponding one of the back bosses 96b. The bearing surface 142 is surrounded by the opening 92 of the lower plate 88.

The bracket member 138 includes a pair of support portions 146a and 146b extending downward from the bearing surface 142. Tapped holes 148a and 148b are formed in end portions of the support portions 146a and 146b.

Referring to FIGS. 1 and 7, bolts 150 are inserted into the front hole 144f and the back holes 144b. Referring to FIG. 7, the bolts 150 are screwed into the tapped holes 98 of the lower panel 76, and thereby the bracket member 138 is fixed to the lower surface of the lower panel 76. The number of the bolts 150 is not limited to three.

The bracket member 138 is disposed so as to be offset toward the fuel gas device unit 84 from the center of the fuel cell stack 12 in the stacking direction (direction of arrow B). Referring to FIG. 2, the distance S1 from the center of the bracket member 138 to the first end plate 26a is smaller than the distance S2 from the center of the bracket member 138 to the second end plate 26b.

The bracket member 138 is fixed to the mount member 130 by driving bolts 152 into the tapped holes 148a and 148b of the support portions 146a and 146b.

Referring to FIGS. 1 and 2, a fuel cell cooling radiator 154 is disposed at an end of the second vehicle frame 14SF. The fuel cell stack 12 is disposed behind and close to the radiator 154.

Hereinafter, an operation of the fuel cell stack 12, which is mounted in the fuel cell electric automobile 14, will be described.

Referring to FIG. 3, when the fuel cell electric automobile 14 is driven, a fuel gas, such as a hydrogen-containing gas (for example, hydrogen gas), is supplied from the fuel gas supply manifold member 66a on the first end plate 26a to the fuel gas inlet manifold 44a. An oxidant gas, such as an oxygen-containing gas (for example, air), is supplied from the oxidant gas supply manifold member 64a on the first end plate 26a to the oxidant gas inlet manifold 42a.

Referring to FIG. 4, the fuel gas flows from the fuel gas inlet manifold 44a into the fuel gas channel 50 of the second separator 40. The fuel gas flows in the direction of arrow A and is supplied to the anode electrode 62 of the membrane electrode assembly 36. The oxidant gas flows from the oxidant gas inlet manifold 42a into the oxidant gas channel 48 of the first separator 38. The oxidant gas flows in the direction of arrow A and is supplied to the cathode electrode 60 of the membrane electrode assembly 36.

In the membrane electrode assembly 36, the fuel gas supplied to the anode electrode 62 and the oxidant gas supplied to the cathode electrode 60 are consumed by electrochemical reactions in the electrode catalyst layers, thereby generating electric power.

Referring to FIG. 3, the fuel gas is discharged from the fuel gas outlet manifold 44b to the fuel gas discharge manifold member 66b on the first end plate 26a. The oxidant gas is discharged from the oxidant gas outlet manifold 42b to the oxidant gas discharge manifold member 64b on the first end plate 26a.

Referring to FIG. 2, a coolant, such as pure water, ethylene glycol, or oil, is supplied from the coolant supply manifold member 68a on the second end plate 26b to the pair of coolant inlet manifolds 46a. Referring to FIG. 4, the coolant supplied to the coolant inlet manifolds 46a flows into the coolant channel 52 between the first separator 38 and the second separator 40 that are located adjacent to each other. The coolant temporarily flows inward in the direction of arrow C, then flows in the direction of arrow A, and cools the membrane electrode assembly 36. The coolant flows outward in the direction of arrow C, flows through the pair of coolant outlet manifolds 46b, and is discharged to the coolant discharge manifold member 68b on the second end plate 26b (see FIG. 2).

Electric power generated by the fuel cell stack 12, which is operated as described above, is supplied to the drive motor 126, and thereby the fuel cell electric automobile 14 moves. Referring to FIG. 1, if an external load F, which is an impact, is applied from the front side of the fuel cell electric automobile 14 in the direction of arrow Ab (backward in the vehicle-length direction), a front part of the fuel cell electric automobile 14 is likely to be deformed inward.

In this case, the radiator 154 may move backward (in the direction of arrow Ab) and contact the fuel cell stack 12, thereby applying a load to the fuel cell stack 12 in the backward direction. The vehicle mount structure 10 includes the side mounts 110a and 110b, which are fixed to the first vehicle frames 14R and 14L, and the bracket member 138, which is fixed to the second vehicle frame 14SF.

Accordingly, if an external load F is applied to the fuel cell stack 12 in a horizontal direction, the side mounts 110a and 110b and the bracket member 138 can bear the external load F.

Referring to FIGS. 5 to 7, in the present embodiment, the lower panel 76, which is the bottom panel of the stack case 28, at least includes the upper plate 86, the lower plate 88, and the intermediate members 90a and 90b. The front boss 96f, including the ribs 100f, and the back bosses 96b, each including the ribs 100b, are disposed on the intermediate member 90b; and the bosses 96f and 96b and the ribs 100f and 100b protrude downward through the opening 92 of the lower plate 88.

Therefore, the front boss 96f and the back bosses 96b, which are fixed to the bracket member 138, are reinforced by the ribs 100f and the ribs 100b. Accordingly, the fuel cell stack 12 can be reliably protected from the external load F with a simple and compact structure.

Moreover, referring to FIG. 5, the front boss 96f and the ribs 100f protrude from the opening 92 of the lower plate 88 by a distance t, and the back bosses 96b and the ribs 100b protrude from the opening 92 by the distance t. The ribs 100b have a sufficient height that ensures sufficient strength. Thus, the thickness of the lower panel 76 (bottom panel) of the stack case 28 can be appropriately reduced. Therefore, interference between the bracket member 138 and the bearing surface 142 can be avoided, and the stack case 28 can be made compact.

Furthermore, referring to FIG. 2, the bracket member 138 is disposed so as to be offset from the center of the fuel cell stack 12 in the direction of arrow B toward the fuel gas device unit 84. Therefore, the load of the fuel gas device unit 84, which is heavy, can be appropriately supported. Moreover, an impact that acts on the fuel gas device unit 84 can be appropriately absorbed, and the fuel gas device unit 84 can be reliably protected from the impact.

Referring to FIG. 6, one front boss 96f and two back bosses 96b are formed on the bottom surface of the intermediate member 90b at positions that are offset toward the end portion 94L, which has a larger width, so as to protrude downward. Accordingly, the front boss 96f and the back bosses 96b can be disposed at portions of the intermediate member 90b having a high strength, and the bracket member 138 can be strongly fixed to the intermediate member 90b.

According to the present embodiment, a vehicle mount structure for mounting a fuel cell stack on a bracket member of a vehicle. The fuel cell stack includes a stack of power generation cells disposed in a stack case, each of the power generation cells generating electric power by an electrochemical reaction between a fuel gas and an oxidant gas.

The vehicle mount structure includes a bottom panel of the stack case, which includes at least an upper plate, a lower plate in which an opening is formed so as to surround a bearing surface of the bracket member, and an intermediate member that is disposed between the upper plate and the lower plate and that is thicker than the upper plate and the lower plate. The vehicle mount structure includes a boss that is disposed on the intermediate member and that includes a rib, the boss and the rib extending through the opening and protruding to a position below the lower plate.

In the vehicle mount structure, preferably, the bracket member is disposed at one position on a back part of the fuel cell stack in a vehicle front-back direction.

In the vehicle mount structure, preferably, a fuel gas device is disposed at one end of the fuel cell stack in a vehicle width direction, and the opening is formed in the lower plate at a position that is offset in a direction toward the one end of the fuel cell stack in the vehicle width direction.

In the vehicle mount structure, preferably, one of a plurality of the bosses is disposed on a front part of the intermediate member in a vehicle front-back direction, and two of the plurality of bosses are disposed on a back part of the intermediate member in the vehicle front-back direction.

With the present disclosure, the boss, which includes the rib, is disposed on the intermediate member, and the boss and the rib protrude to a position below the lower plate. Therefore, the boss, which is fixed to the bracket member, is reinforced by the rib, and the fuel cell stack can be reliably protected against an external load with a simple and compact structure.

Moreover, the boss and the rib protrude downward from the opening of the lower plate. Accordingly, the thickness of the bottom panel of the stack case can be appropriately reduced, and the entirety of the stack case can be made compact.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle mount structure for mounting a fuel cell stack on a bracket member of a vehicle, the fuel cell stack including a stack of power generation cells disposed in a stack case, each of the power generation cells generating electric power by an electrochemical reaction between a fuel gas and an oxidant gas, the vehicle mount structure comprising:
   a bottom panel of the stack case, the bottom panel including at least
       an upper plate,
       a lower plate in which an opening is formed so as to surround a bearing surface of the bracket member, and
       an intermediate member that is disposed between the upper plate and the lower plate and that is thicker than the upper plate and the lower plate; and
   a boss that is disposed on the intermediate member and that includes a rib, the boss and the rib extending through the opening and protruding to a position below the lower plate.

2. The vehicle mount structure according to claim 1, wherein the bracket member is disposed at one position on a back part of the fuel cell stack in a vehicle front-back direction.

3. The vehicle mount structure according to claim 1, wherein a fuel gas device is disposed at one end of the fuel cell stack in a vehicle width direction, and
wherein the opening is formed in the lower plate at a position that is offset in a direction toward the one end of the fuel cell stack in the vehicle width direction.

4. The vehicle mount structure according to claim 1, wherein one of a plurality of the bosses is disposed on a front part of the intermediate member in a vehicle front-back direction, and two of the plurality of bosses are disposed on a back part of the intermediate member in the vehicle front-back direction.

5. A vehicle mount structure comprising:
   a stack case to accommodate a fuel cell stack which includes power generation cells stacked to generate electric power via an electrochemical reaction between a fuel gas and an oxidant gas, the stack case including a bottom panel to be provided on a bracket member of a vehicle, the bottom panel comprising:
       an upper plate;
       a lower plate opposite to and below the upper plate in a height direction of the vehicle, the lower plate having an opening to surround a bearing surface of the bracket member; and
       an intermediate member disposed between the upper plate and the lower plate and having a thickness thicker than a thickness of the upper plate and a thickness of the lower plate; and
   a boss disposed on the intermediate member and including a rib, the boss with the rib protruding toward the bracket member to pass through the opening.

6. The vehicle mount structure according to claim 5, wherein the bracket member is disposed at one position on a back part of the fuel cell stack in a vehicle front-back direction.

7. The vehicle mount structure according to claim 5, wherein a fuel gas device is disposed at one end of the fuel cell stack in a vehicle width direction, and
wherein the opening is formed in the lower plate at a position that is offset in a direction toward the one end of the fuel cell stack in the vehicle width direction.

8. The vehicle mount structure according to claim 5, wherein one of a plurality of the bosses is disposed on a front part of the intermediate member in a vehicle front-back direction, and two of the plurality of bosses are disposed on a back part of the intermediate member in the vehicle front-back direction.

* * * * *